Casimer C. Legal, Jr.
Lionel P. Schindler
INVENTORS

BY Elton Fisher
ATTORNEY

Casimer C. Legal, Jr.
Lionel P. Schindler
INVENTORS

BY Elton Fisher

ATTORNEY

June 15, 1971   C. C. LEGAL, JR., ET AL   3,585,020
NONBURNING FERTILIZER COMPOSITION
Filed Dec. 11, 1968   7 Sheets-Sheet 6

Casimer G. Legal, Jr.
Lionel P. Schindler
INVENTORS

BY  Elton Fisher
ATTORNEY

FIG. 9

INVENTORS
Casimer C. Legal, Jr.
Lionel P. Schindler

BY Elton Fisher

ATTORNEY

United States Patent Office 3,585,020
Patented June 15, 1971

3,585,020
NONBURNING FERTILIZER COMPOSITION
Casimer C. Legal, Jr., Elkridge, and Lionel P. Schindler, Baltimore, Md., assignors to W. R. Grace & Co., New York, N.Y.
Continuation-in-part of application Ser. No. 641,767, May 29, 1967. This application Dec. 11, 1968, Ser. No. 782,852
Int. Cl. C05c 9/00
U.S. Cl. 71—29
9 Claims

ABSTRACT OF THE DISCLOSURE

This invention is directed to a free-flowing, granular, nonburning, and noncrumbling 7–40–6 fertilizer composition consisting essentially of coprecipitated and cogranulated magnesium ammonium phosphate, magnesium potassium phosphate, monoammonium dihydrogen phosphate, monopotassium dihydrogen phosphate, magnesium hydroxide, and urea and to a process for manufacturing such fertilizer composition, all as recited hereinafter.

CROSS REFERENCE TO RELATED APPLICATIONS

This is a continuation-in-part of our copending application Ser. No. 641,767, filed May 29, 1967 and now abandoned.

BACKGROUND OF THE INVENTION

This invention is in the field of nonburning fertilizers.

In the prior art a somewhat similar nonburning fertilizer composition was prepared by granulating magnesium ammonium phosphate with magnesium potassium phosphate. Such a fertilizer is described in British Pat. 1,026,937. Although the fertilizer composition prepared by the process of said patent has excellent nonburning properties where freshly prepared, it crumbles into fine particles on storage for periods of several months (e.g., ca. 3–6 months) or on shipment involving considerable handling of bags containing the fertilizer with the resulting loss of at least some of its nonburning qualities. In this respect it should be noted that it has been found that granular nonburning fertilizers lose their nonburning properties if the fertilizer granules crumble or are pulverized to yield appreciable quantities of pulverulent fertilizer material.

SUMMARY OF THE INVENTION

In summary, this invention is directed to a free-flowing, granular, nonburning, noncrumbling 7–40–6 fertilizer composition consisting essentially of coprecipitated and cogranulated magnesium ammonium phosphate ($MgNH_4PO_4 \cdot H_2O$), magnesium potassium phosphate ($MgKPO_4 \cdot H_2O$), monoammonium dihydrogen phosphate ($NH_4H_2PO_4$), monopotassium dihydrogen phosphate ($KH_2PO_4$), magnesium hydroxide ($Mg(OH)_2$), and urea said granules of said fertilizer composition are aggregates of particles having an average particle size of about 1.5 x 0.75 microns, and said granules having a crushing resistance substantially according to the following schedule:

| Granules diameter, millimeters: | Crushing resistance, pounds |
|---|---|
| 4.4 | 7.0 |
| 6.0 | 11.6 |
| 7.1 | 14.4 |
| 10.5 | 26.3 | with intermediate values substantially proportional.

DESCRIPTION OF PREFERRED EMBODIMENTS

In preferred embodiments of the fertilizer composition described in the above summary:

(1) Said composition analyzes about 55.5–69% magnesium ammonium phosphate, 6–8% magnesium potassium phosphate, 5–8% monoammonium dihydrogen phosphate, 13–20% monopotassium dihydrogen phosphate, 4–6% magnesium hydroxide, 0.9–1.8% urea, 0.8–1.2% inert material, and 2–4% free water, to total 100% with the N—$P_2O_5$—$K_2O$ assay of the fertilizer composition being about 7–40–6 (By "free water" is meant water which is occluded, adsorbed, or absorbed, or the like by the fertilizer granules; free water does *not* include water of hydration, and neither does it include water which is chemically bound such as the "water component" of $Mg(OH)_2$ even though it has been found that water of hydration and the water component of $Mg(OH)_2$ can be liberated if the fertilizer composition is heated to a sufficiently high temperature for a sufficient period of time. For example, $MgNH_4PO_4 \cdot H_2O$ and $MgKPO_4 \cdot H_2O$ can be dehydrated to yield $MgNH_4PO_4$ and $MgKPO_4$, respectively, and pyrolysis of $Mg(OH)_2$ yields $H_2O$ and MgO;

(2) The granules of said composition pass about a 6 mesh screen and are retained on about a 14 mesh screen;

(3) The granules of said composition pass about a ½ inch screen and are retained on a 6 mesh screen; and (4) Said composition analyzes about: (i) 6.5–7.1% total nitrogen, as N; (ii) 42–46% total phosphoric acid, as $P_2O$; (iii) 7.2–8% total potash, and $K_2O$; and (iv) 1.4–2.5% water soluble nitrogen, as N. (The water soluble nitrogen being the difference between total nitrogen determined by AOAC procedure 2.044, and water insoluble nitrogen determined by AOAC procedure 2.057—both methods being reported in the Tenth (1965) edition of

"Official Methods of the Association of Official Agricultural Chemists.")

In a preferred embodiment ("Embodiment A") the instant invention is directed to a process for preparing a free-flowing, granular, nonburning, noncrumbling 7–40–6 fertilizer product, the granules of said fertilizer product being aggregates of particles having an average particle size of about 1.5 x 0.75 microns (with individual particle sizes ranging from about 0.2 x 0.1 micron to about 4 x 3 microns) said granules having a crushing resistance substantially according to the following schedule:

| Granule diameter, millimeters: | Crushing resistance, pounds |
| --- | --- |
| 2.8 | 4.8 |
| 4.4 | 7.0 |
| 6.0 | 11.6 |
| 7.1 | 14.4 |
| 10.5 | 26.3 | with intermediate values substantially proportional by a process comprising continuously and simultaneously:

(a) forming a first mixture by mixing in a mixer (preferably in an in-line mixer); (1) an aqueous solution of urea and the ammonia, the solution analyzing about 35–45% urea and the ammonia taken with that referred to in "(2)" below totaling about 170–180 pounds of ammonia, as $NH_3$, per ton of 7–40–6 fertilizer product formed; (2) liquid anhydrous ammonia; and (3) an aqueous magnesium hydroxide slurry having a solid content of about 30–60% (preferably about 36–42%), said slurry assaying about 20–41% MgO, with feed rates to the mixer providing; (i) about 40–46 pounds of urea, as added as said aqueous solution, per ton of said 7–40–6 fertilizer product formed; (ii) a total ammonia feed, that is the liquid anhydrous ammonia plus the ammonia referred to in "(1)" above, of about 170–180 pounds of ammonia, as $NH_3$, per ton of said 7–40–6 fertilizer product formed; and (iii) about 405–415 pounds of MgO, fed as said magnesium hydroxide slurry, per ton of said 7–40–6 fertilizer product formed. (We have found that the aqueous solution of urea and ammonia can be replaced by an aqueous urea solution analyzing about 35–45% urea. When using such urea solution, additional liquid ammonia is added in "(2)," supra, so that the total ammonia added is about 170–180 pounds of $NH_3$ per ton of product, thereby to compensate for ammonia which vaporizes from the pug mill and from the product drying step. Such procedure has given excellent results. We have also obtained excellent results where using aqueous solutions of urea and ammonia containing up to about 12% carbon dioxide—see, for example, Example I, infra.);

(b) passing the thus formed first mixture into a first sparger and from said sparger into the bottom portion of a pug mill having an upstream end and a downstream or discharge end (the exact location of the first sparger with respect to its (the first sparger's) distance from the upstream end of the pug mill does not appear to be highly critical. However, we have found that the best results are generally obtained when said sparger is positioned about one-tenth to three-fourths the length of the pug mill downstream from said upstream end);

(c) passing an aqueous orthophosphoric acid solution analyzing about 50–55% $P_2O_5$ into the pug mill via a second sparger positioned immediately downstream of the first sparger at a rate to provide about 860–900 pounds of $P_2O_5$ per ton of said fertilizer product formed;

(d) passing an aqueous potassium hydroxide (KOH) solution analyzing about 35–40% $K_2O$ into the pug mill via a third sparger positioned immediately downstream of the second sparger at the rate of about 144–160 pounds of $K_2O$ fed as said potassium hydroxide solution per ton of said fertilizer product formed;

(e) passing water into the pug mill via a fourth sparger positioned immediately upstream of the first sparger, the water being added at a rate to maintain a moisture content of about 25–35% in wet product withdrawn from the pug mill in a later recited withdrawing step;

(f) recycling to the pug mill product selected from the group consisting of (i) an undersize fraction from a later recited screening step; (ii) a product size fraction from said screening step; and (iii) a mixture of said undersize fraction and said product size fraction;

(g) forming granular fertilizer product in the pug mill;

(h) withdrawing the granular fertilizer from the downstream end of the pug mill;

(i) passing the granular fertilizer through a drier where said fertilizer is dried by contacting it (said fertilizer) with a stream of air having an inlet temperature of about 450–1000° F. (preferably 460–650° F.);

(j) passing the thus dried granular fertilizer product through a cooler where it (said fertilizer) is cooled below about 130° F. by contacting it (said fertilizer) with a stream of air having an inlet temperature below about 100° F.

(k) screening the thus cooled fertilizer to obtain (i) an undersize fraction, (ii) at least one product size fraction; and (iii) an oversize fraction; and (l) recovering the product size fraction.

In especially preferred embodiments of the process set forth in Embodiment A, supra;

(1) The oversize fraction is crushed and recycled to the screen step.

(2) The recycled product is fed into the pug mill upstream of the fourth sparger.

(3) The product size fraction passes a 6 mesh screen and is retained on a 14 mesh screen; and (4) The product size fraction passes a ½ inch screen and is retained on a 6 mesh screen.

In another preferred embodiment ("Embodiment B") the instant invention is directed to a process for preparing a free-flowing granular, nonburning, noncrumbling 7–40–6 fertilizer product consisting essentially of coprecipitated and cogranulated magnesium ammonium phosphate, magnesium potassium phosphate, monoammonium dihydrogen phosphate, monopotassium dihydrogen phosphate, magnesium hydroxide and urea, the granules of said fertilized product being aggregates of particles having an average particle size of about 1.5 x 0.75 microns, said granules having a crushing resistance substantially according to the following schedule:

| Granule diameter, millimeters: | Crushing resistance, pounds |
| --- | --- |
| 2.8 | 4.8 |
| 4.4 | 7.0 |
| 6.0 | 11.6 |
| 7.1 | 14.4 |
| 10.5 | 26.3 | with intermediate values substantially proportional, said process comprising continuously and simultaneously:

(a) mixing (preferably in an in-line mixer); (1) a nitrogen solution consisting essentially of about 43.3% urea, 30.5% ammonia, 16.2% water, and 10% carbon dioxide, said nitrogen solution analyzing about 45.5% N; (2) liquid anhydrous ammonia; and (3) a magnesium hydroxide slurry consisting essentially of magnesium hydroxide and water, said slurry having a solid content ranging from about 30% to about 60%, said slurry assaying about 20% to about 41% MgO; the feed rates being; (1) about 100 pounds of said nitrogen solution per ton of said 7–40–6 fertilizer formed; (2) about 146 pounds of said liquid anhydrous ammonia per ton of said 7–40–6 fertilizer product formed; and (3) about 410 pounds of MgO, fed as said magnesium hydroxide slurry, per ton of said 7–40–6 fertilizer formed;

(b) passing the thus formed mixture of said nitrogen solution, said liquid ammonia, and said magnesium hydroxide slurry into a first sparger and from said sparger into the bottom portion of a pug mill, said first sparger being positioned about one-fifth to one-third of the length of said pug mill downstream from the upstream end of said pug mill;

(c) passing about a 75% orthophosphoric acid solution analyzing about 54.3% $P_2O_5$ into the pug mill via a second sparger positioned immediately downstream of the first sparger at the rate of about 1620 pounds of said solution per ton of said fertilizer product;

(d) passing about a 45% potassium hydroxide solution analyzing about 37.7% $K_2O$ into the pug mill via a third sparger positioned immediately downstream of the second sparger at the rate of about 398 pounds of said solution per ton of said fertilizer product;

(e) passing water selected from the group consisting of fresh water, scrubbing water from a later recited scrubbing step, and mixtures thereof into the pug mill via a fourth sparger positioned immediately upstream of the first sparger;

(f) recycling product dust from later recited dust collecting steps to the pug mill upstream of the spargers;

(g) recycling to the pug mill upstream of the spargers product selected from the group consisting of (i) an undersize fraction from a later recited screening step; (ii) a product size fraction from said screening step; and (iii) a mixture of said undersize fraction and said product size fraction;

(h) forming granular fertilizer product in the pug mill;

(j) passing the granular fertilizer through a rotary drum drier where said fertilizer is dried by rotating in the presence of a stream of air having an inlet temperature of about 450–1000° F. (or 460–650° F.);

(k) passing the thus dried granular fertilizer through a rotary cooler where said fertilizer is cooled below about 130° F. in the presence of a stream of air having an inlet temperature below about 100° F.

(l) withdrawing ammonia-containing air from the upper (top) portion of the downstream end of the pug mill and passing the withdrawn air through a scrubber where said air is scrubbed with water.

(m) passing air laden with product dust from the rotary drum drier through a first cyclone dust collector where said dust is collected;

(n) passing air laden with product dust from the rotary cooler through a second cyclone dust collector where said dust is collected;

(o) recycling product dust collected in the first and second cyclone dust collectors from said collectors to the pug mill;

(p) passing air from the first and second dust collectors through the aforesaid scrubber and scrubbing said air with water;

(q) venting air from the scrubber to the atmosphere (e.g., via an exhaust fan);

(r) passing used scrubbing water from the scrubber to the pug mill;

(s) adding make-up water to the scrubber;

(t) passing cooled granular fertilizer from the rotary cooler to a first screen, said screen having a double deck, where the granular fertilizer product is screened to yield three fractions of granules; (1) a fine fraction; (2) a first product size fraction; and (3) a first oversize fraction;

(u) recycling the fine fraction to the pug mill;

(v) passing the first product size fraction to a bypass means from which any desired portion of said fraction can be recycled to the pug mill and from which the remainder of said fraction is recovered;

(w) passing the first oversize fraction of granular fertilizer to a second screen, said screen having a single deck, where said fraction is secreened to yield two fractions of granules; (1) a second product size fraction; and (2) a second oversize fraction;

(x) recovering the second product size fraction;

(y) passing the second oversize fraction to a crusher where said fraction is crushed to yield crushed granules; and (z) recycling the crushed granules to the first screen.

In another preferred embodiment ("Embodiment C") this invention is directed to, as a new article of manufacture, a nonburning 7–40–6 fertilizer (i.e., a fertilizer having a N—$P_2O_5$—K assay of about 7–40–6) in the form of free-flowing non-crumbling granules, said granules; (i) having crushing resistance substantially according to the following schedule:

| Granules diameter, millimeters: | Crushing resistance pounds |
|---|---|
| 4.4 | 7.0 |
| 6.0 | 11.6 |
| 7.1 | 14.3 |
| 10.5 | 26.3 | with intermediate values substantially proportional; and (ii) being aggregates of particles having an average particle size of 1.5 x 0.75 microns; said fertilizer consisting essentially of coprecipitated and cogranulated magnesium ammonium phosphate, magnesium potassium phosphate, monoammonium dihydrogen phosphate, monopotassium dihydrogen phosphate, magnesium hydroxide, and urea.

In preferred embodiments of the article of manufacture described in Embodiment C, supra:

(1) Said granules analyze about; (i) 55.5–69% ammonium phosphate; (ii) 6–8% magnesium potassium phosphate; (iii) 5–8 monoammonium dihydrogen phosphate; (iv) 13–20% monopotassium dihydrogen phosphate; (v) 4–6% magnesium hydroxide (calculated as $Mg(OH)_2$); (vi) 0.8–1.2% inert material; 0.9–1.8% urea; and (viii) 2–4% free water to total 100%.

(2) Said granules pass about a 6 mesh screen and are retained on about a 14 mesh screen;

(3) Said granules pass about a ½ inch screen and are retained on a 6 mesh screen; and (4) Said granules analyze about (i) 6.5–7.1% total nitrogen, as N; (ii) 42–46% total phosphoric acid, as $P_2O$; and (iii) 7.2–8% total potash, as $K_2O$; and (iv) 1.4–2.5% water soluble nitrogen, as N. (The water soluble nitrogen being the difference between total nitrogen determined by AOAC procedure 2.044, and water insoluble nitrogen determined by AOAC procedure 2.057– both methods being reported in the Tenth (1965) edition of "Official Methods of the Association of Official Agricultural Chemists").

Our invention is further illustrated by the following examples. It is understood that the instant invention is not limited to these specific examples which are being offered merely as illustrations and that modifications can be made without departing from the spirit and scope of the invention.

EXAMPLE I

Figure 1:
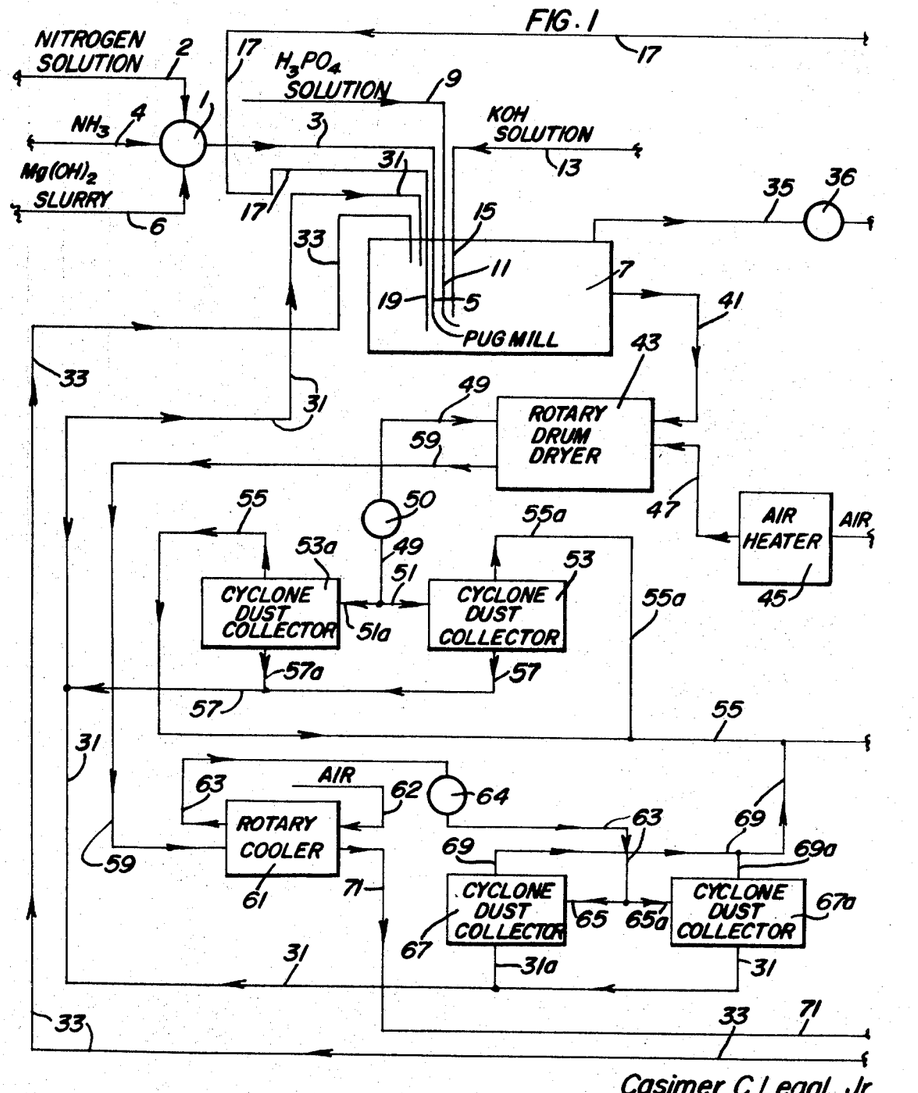
FIGS. 1 and 2 are a flowsheet of the process by which we prefer to make the fertilizer composition of the instant invention.
Figure 2:
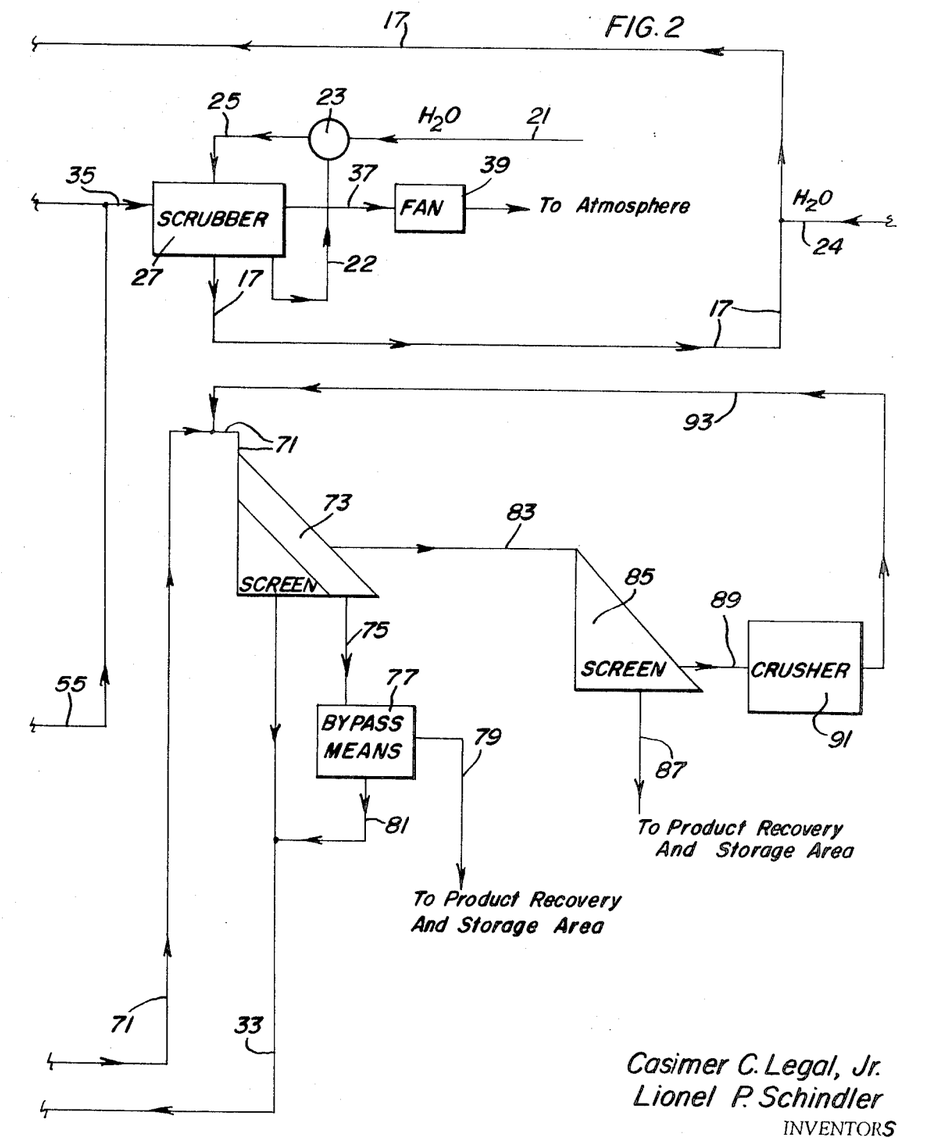
Figure 5:
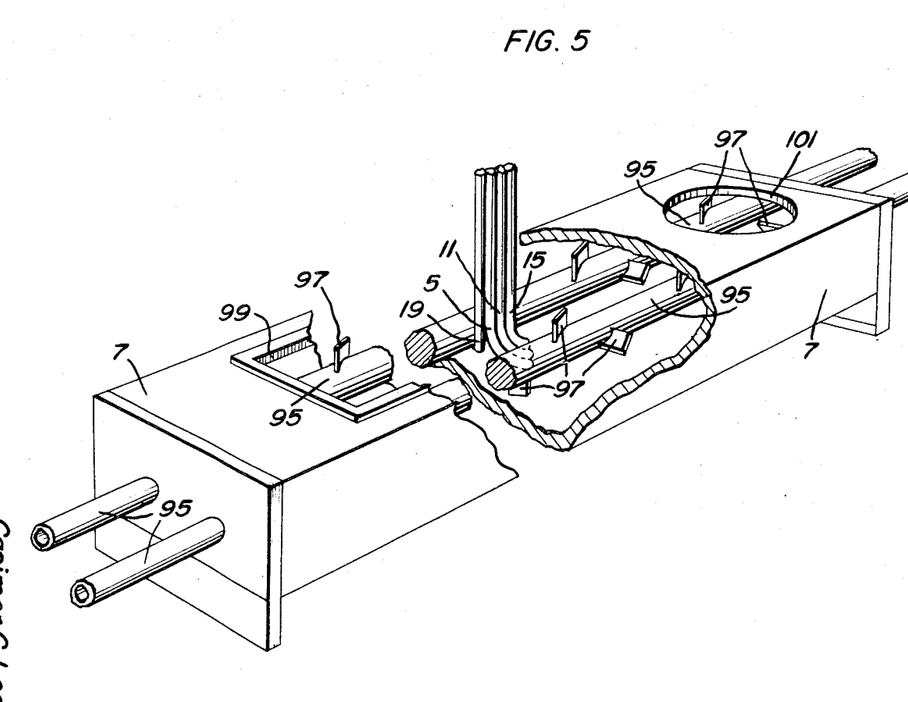
FIG. 5 is a perspective view of a two-shaft pug mill with parts cut away to show in detail the arrangement of spargers (for adding reactants and water to the pug mill) which we prefer to use in the preparation of the fertilizer composition of our invention.

Refer to FIG. 1 and FIG. 2 which constitute a flowsheet of the procedure used in this example. Also, refer to FIG. 3 which shows a pug mill with spargers arranged therein and to FIG. 5 which shows in somewhat more detail the preferred arrangement of the spargers for use in this invention according to the procedure set forth in Example I.

The procedure set forth in this example represents the preferred method for preparing the free-flowing, granular, nonburning, and noncrumbling 7–40–6 fertilizer composition of this invention. We have found it appropriate to add about 25% excess $K_2O$ to be certain of obtaining about 6% available $K_2O$ by the Official AOAC method of analysis—it is appropriate to add sufficient KOH solution to produce a granular fertilizer having a *total* $K_2O$ content of at least about 7.4%, thereby to obtain a granular fertilizer analyzing about 6% *available* $K_2O$.

Figure 3:
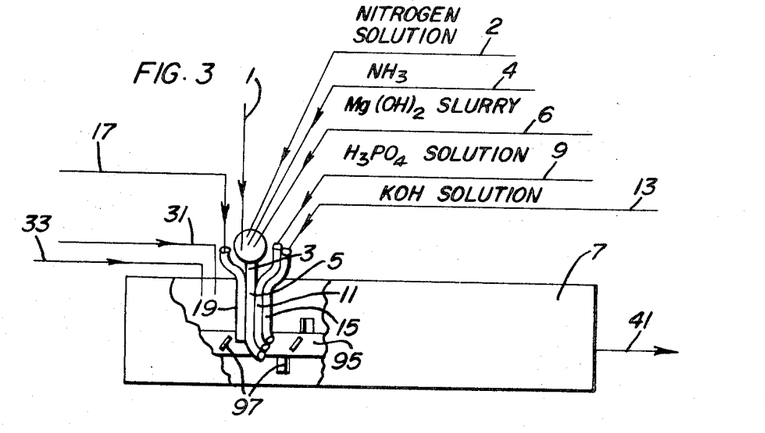
FIG. 3 is a schematic diagram of a pug mill showing the arrangement of spargers used to add reactants and water to the pug mill in the process which we prefer to use in the praparation of the fertilizer composition of this invention.

A nitrogen solution consisting essentially of 43.3% urea, 30.5% ammonia, 16.2% water, and 10% carbon dioxide, said nitrogen solution analyzing 45.5% N, was passed via line 2 into in-line mixer 1. Said in-line mixer was a Gifford-Wood four inch Pipe Line Homogenizer. While we prefer to use this type of in-line mixer we have obtained excellent results using two mixing T's arranged in series. We have also obtained excellent results using a mixing cross. Simultaneously, liquid anhydrous ammonia was fed via line 4 into the aforesaid in-line mixer 1. Also, simultaneously, a magnesium hydroxide slurry consisting essentially of magnesium hydroxide and water, said slurry having a solid content ranging from about 36% to about 42%, said slurry assaying about 24.1% to about 28.2% MgO was passed into in-line mixer 1. Feed rates were; (1) about 100 pounds of said nitrogen solution per ton of said 7–40–6 fertilizer formed; (2) about 146 pounds of said liquid anhydrous ammonia per ton of said 7–40–6 fertilizer formed; and (3) about 410 pounds of MgO, fed as said magnesium hydroxide slurry, per net ton of said 7–40–6 fertilizer formed. The thus formed mixture of nitrogen solution, liquid anhydrous ammonia, and magnesium hydroxide slurry passed from in-line mixer 1 via line 3 to sparger 5 which fed the mixture into the bottom portion of pug mill 7 slightly (about one-fourth of the length of the pug mill) downstream from the upstream end of said pug mill. Simultaneously, a 75% aqueous solution of orthophosphoric acid analyzing about 54.3% $P_2O_5$ was passed into pug mill 7 via line 9 and sparger 11, said sparger 11 being positioned immediately downstream of sparger 5. Said phosphoric acid solution was fed into pug mill 7 at the rate of about 1620 pounds per ton of 7–40–6 product. Simultaneously, a 45% solution of potassium hydroxide analyzing about 37.7% $K_2O$ was continuously passed into pug mill 7 via line 13 and sparger 15, said sparger 15 being positioned immediately downstream of sparger 5. Said KOH solution was fed into the pug mill at the rate of 398 pounds per ton of 7–40–6 product. Simultaneously and continuously, water, which could be fresh water, water from a later recited scrubbing step, or mixtures thereof, was passed into pug mill 7 via line 17 and sparger 19, said sparger 19 being positioned immediately upstream of sparger 5. The rate that water was added to the pug mill was governed by the thickness of the material in the pug mill, if the material was too thick more water was added, if the material was too thin less water was added. To some extent, the quantity of water added to the pug mil via sparger 19 varied as a function of the amount of material (product dust, fine product, and crushed oversize product) recycled to pug mill 7.

Fertilizer granules passed from pug mill 7 via conveyor means 41 to rotary drum drier 43 where said granules were dried by contact with a stream of heated air from air heater 45 and line 47. Air entered rotary drum drier 43 at about 400–650° F. and exited from said drum drier via line 49 at about 200–215° F.

Dried fertilizer granules passed from rotary drum 43 via line 59 to rotary cooler 61 where said granules were contacted with a stream of air which entered rotary cooler 61 via line 62 and passed from said cooler via line 63. Cooling air entered rotary cooler 61 at about 65–95° F. and passed from said cooler at about 90–125° F.

Cooled fertilizer granules passed from rotary cooler 61 via conveyor means 71 to two deck screen 73. This screen gave three fractions of fertilizer granules, these were: (a) a fine fraction; (b) a first product size fraction; and (c) a first oversize fraction.

The fine fraction from screen 73 was recycled via conveyor means 33 to the upstream end of pug mill 7.

The first product size material from screen 72 passed via conveyor means 75 to bypass means 77. Said bypass means provided a means, whereby any portion ranging from none to all of the first product size material could be recycled via conveyor means 81 and conveyor means 33 to the upstream end of pug mill 7. First product size material from bypass means 77 which was not recycled to pug mill 7 passed from said bypass means via conveyor means 79 to a product recovery and storage area where said product was recovered.

The first oversize fraction passed via conveyor means 83 to single deck screen 85 which produced two fractions; (a) a second oversize fraction; and (b) a second product size fraction. The second oversize fraction passed from screen 85 via conveyor means 89 to crusher 91. Product from crusher 91 passed via conveyor means 93 to conveyor means 71 which recycled the crushed product to screen 73.

The second product size fraction from screen 85 passed via line 87 to a product recovery and storage area where said product was recovered.

Air was withdrawn from the downstream end of pug mill 7 via line 35 and damper 36 by fan 39. The thus withdrawn air passed through scrubber 27 where it was contacted with water which entered said scrubber via line 25. Water passed from scrubber 27 via lines 17 and 22. Water passing from said scrubber into line 17 was passed into pug mill 7 via sparger 19, while adding extra water (via line 24) as needed to maintain a proper consistency of the material being granulated in said pug mill. Water passing from scrubber 27 via line 22 was recycled to said scrubber via metering means 23 and line 25. Make-up water was added to said scrubber as needed via line 21 and metering means 23. Scrubbed air passed to the atmosphere via line 37 and fan 39.

Air exit rotary drum drier 43 passed via line 49 and damper 50 to line 51 and 51a which fed into cyclone dust collectors 53 and 53a. Dust from said dust collectors passed via conveyor means 57 and 57a to conveyor means 31 which recycled the thus collected dust into the upstream end of pug mill 7. Air from dust collectors 53 and 53a passed via lines 55 and 55a to line 35 and thence to scrubber 27. Scrubbed air from scrubber 27, as noted supra, passed via line 37 and fan 39 to the atmosphere.

Air from rotary cooler 61 passed via line 63, damper 64, and lines 65 and 65a to cyclone dust collectors 67 and 67a. Dust from said dust collectors passed via conveyor means 31 and 31a to the upstream end of pug mill 7. Air from dust collectors 67 and 67a passed via lines 69 and 69a to line 55 and thence to line 35, scrubber 27, line 37, and finally to the atmosphere via fan 39.

We generally prefer to use a recycle ratio of about 2–3:1. However, other recycle ratios, for example, 1:1 or less, have given excellent results in the process of our invention. As noted supra, the quantity of water added to pug mill 7 is a function of the recycle ratio with higher recycle ratios requiring larger amounts of water.

We generally prefer to obtain from screen 73 a first product size fraction passing a 6 mesh screen and retained on a 14 mesh screen and we generally prefer to obtain a second product size fraction (from screen 85) which passes a ½ inch screen and is retained on a 6 mesh screen. However, if desired (e.g., for some special use) other size fractions can be obtained by changing the mesh of the screens on the scree decks of screen 73, or of screen 85, or of both screens 73 and 85. We have done this in a number of instances with excellent results.

In one run lasting about 20 days we obtained about 445 tons of our fertilizer product or composition passing a 6 mesh screen and retained on a 14 mesh screen. In the same run we also obtained about 882 tons of our fertilizer composition passing a ½ inch screen and retained on a 6 mesh screen. Our thus prepared fertilizer composition analyzed 7% total nitrogen, 44.8% total $P_2O_5$, 7.4% total $K_2O$, 12.1% Mg, and 3.1% moisture, i.e., free water as defined supra. The available $K_2O$ was 6.2%.

The crushing resistance (sometimes called crushing strength) of particles of the thus prepared fertilizer composition was determined using an instrument which is conventionally used in determining the crushing resistance of pellets of catalyst. The instrument consists of a plunger driven by gas pressure applied to a ⅜ inch piston. This instrument is calibrated to read directly in pounds. A pellet (granule, in this instance) was placed beneath a downcoming plunger, or piston rod, and contact was made. The build-up of pressure on the piston was shown on a gauge. The maximum value was reached when the granule fractured; said value is the crushing resistance of the granule.

Figure 9:
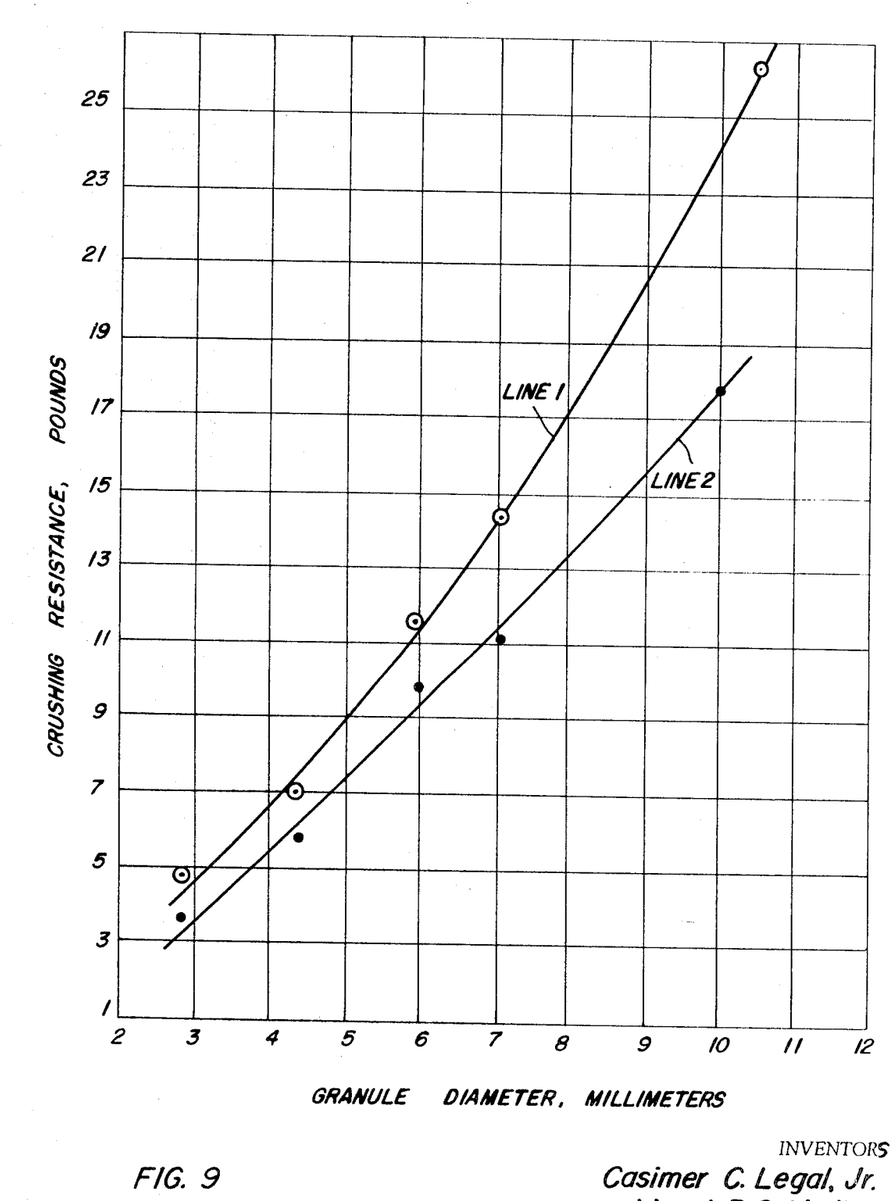
FIG. 9 is a plot of crushing resistance of fertilizer granules vs. diameter of the granules. Line 1 shows the results obtained with granules prepared according to the procedure (Example I) which we prefer to use in the preparation of the fertilizer composition of the instant invention. Line 2 shows the results obtained with granules of a fertilizer composition prepared according to the procedure of Example II.

Line 1 of FIG. 9 and the following table show the results obtained:

| Granule diameter, millimeters: | Crushing resistance, pounds |
|---|---|
| 2.8 | 4.8 |
| 4.4 | 7.0 |
| 6.0 | 11.6 |
| 7.1 | 14.4 |
| 10.5 | 26.3 |

Figure 6:
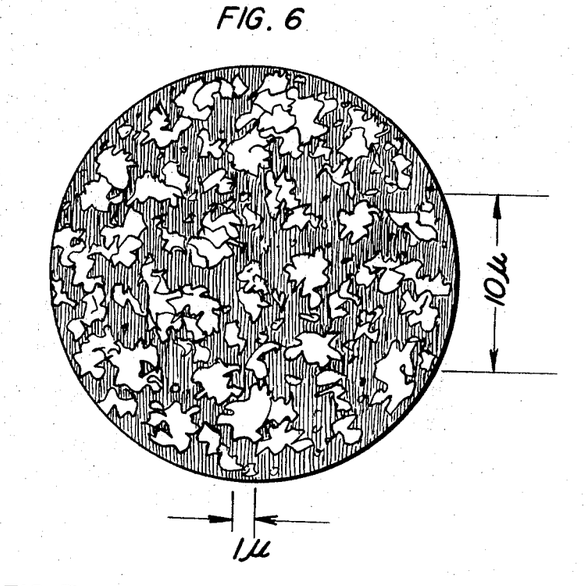
FIG. 6 is a drawing of an electron micrograph of the crystals comprising the aggregates (granules) of the free-flowing, granular, nonburning, and noncrumbling 7–40–6 fertilizer composition of our invention, said granular fertilizer composition being prepared by the method of Example I.

FIG. 6 is an electron micrograph of individual crystals comprising the aggregates (granules) of the fertilizer composition of our invention made by the process of Example I. These crystals had an average paritcle size of about 1.5 x 0.75 microns with individual particle sizes varying over a range of about 0.2 x 0.2 micron to about 3.5 x 2 microns.

The fertilizer composition of our invention, made according to the procedure of Example I, has retained its free-flowing, granular, nonburning, and noncrumbling characteristics even where stored for periods of 8–24 months or longer and where shipped for long distances—even where such shipping involved much handling and dropping of bags containing the fertilizer composition.

As used herein the term "noncrumbling" means that our granules retain their form and do not powder, do not break-up to any substantial extent, and do not turn into dust, and do not otherwise decompose on storage or on handling the bags in which the fertilizer is packaged.

EXAMPLE II

Figure 4:
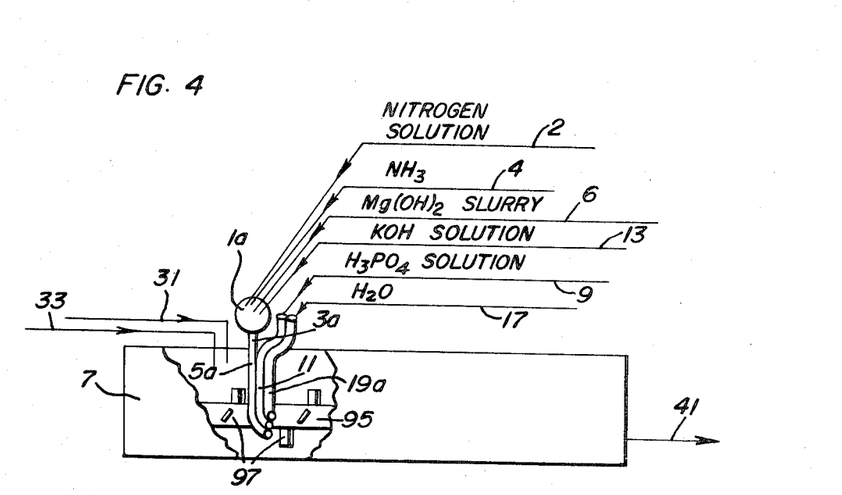
FIG. 4 is a schematic diagram of a pug mill showing an arrangement of spargers (for adding reactants and water to the pug mill) which *failed* to produce the noncrumbling fertilizer composition of our invention.

Refer to FIGS. 1, 2, and 4. The general procedure of Example I was repeated. However, in this instance the procedure was modified by feeding the nitrogen solution, the liquid anhydrous ammonia, the magnesium hydroxide slurry, and the potassium hydroxide solution into in-line mixer 1a (FIG. 4) (a Gifford-Wood four inch Pipe Line Homogenizer) where these materials were mixed. The thus formed mixture passed via line 3a and sparger 5a (FIG. 4) into pug mill 7. The phosphoric acid solution was fed into the pug mill via line 9 and sparger 11 which was positioned immediately downstream of said sparger 5a (FIG. 4) and water, including water from scrubber 27, was fed into the pug mill via line 17 and sparger 19a (FIG. 4) which was positioned immediately downstream of the aforesaid sparger 11. The raw materials used in this example met the same specifications (analyses and the like) as those used in Example I. In this example feed rates were about 108 pounds of the aforesaid nitrogen solution, 137 pounds of liquid anhydrous ammonia, 450 pounds of MgO fed as the aforesaid magnesium hydroxide slurry, 403 pounds of the aforesaid potassium hydroxide solution, and 1560 pounds of the aforesaid orthophosphoric acid solution per net ton of product.

In this instance the fertilizer granules crumbled and the fertilizer lost much of its granular character upon storage for three or four months or upon shipping which involved an appreciable amount of handling or dropping of bags containing fertilizer. Upon crumbling the fertilizer lost its nonburning characteristics.

Figure 8:
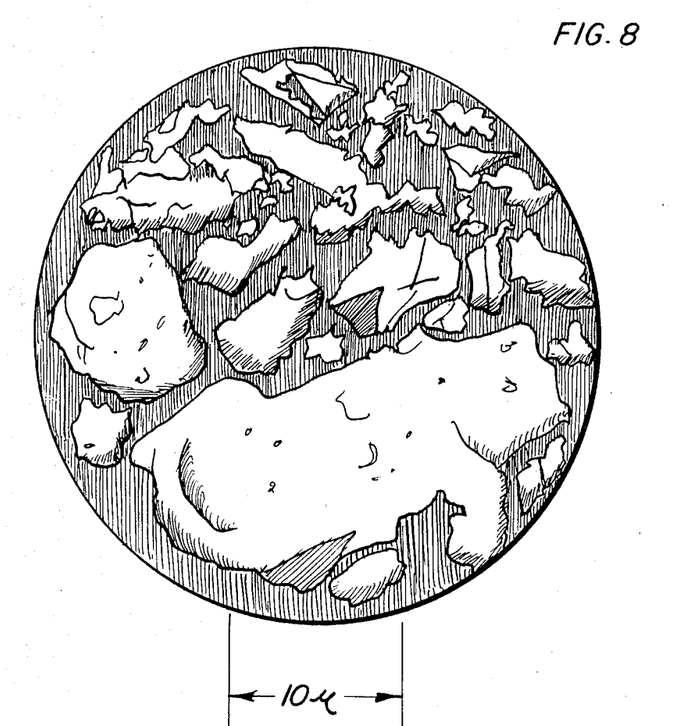
FIG. 8 is a drawing of an electron micrograph of the crystals comprising aggregates (granules) of a fetrtilizer composition made by the process of Example II.

FIG. 8 is a drawing of an electron micrograph of the crystals comprised of the aggregates (granules) of fertilizer prepared according to the procedure of Example II. These crystals had an average particle size of about 15 x 8.25 microns with individual particle sizes varying over a range of about 0.5 x 0.5 micron to about 24 x 10 microns.

Crushing resistance of said granules was determined using the method described supra. Said crushing resistance is shown in the following table and by line 2 of FIG. 9.

| Granule diameter, millimeters: | Crushing resistance, pounds |
|---|---|
| 2.8 | 3.6 |
| 4.4 | 5.8 |
| 6.0 | 9.8 |
| 7.1 | 11.2 |
| 10.0 | 17.8 |

Product prepared according to the procedure of this example analyzed 2.9% moisture (free water), 6.8% total nitrogen, 44.6% $P_2O_5$, 8.1% total $K_2O$, 6.1% available $K_2O$ and 12.6% Mg.

EXAMPLE III

Figure 10:
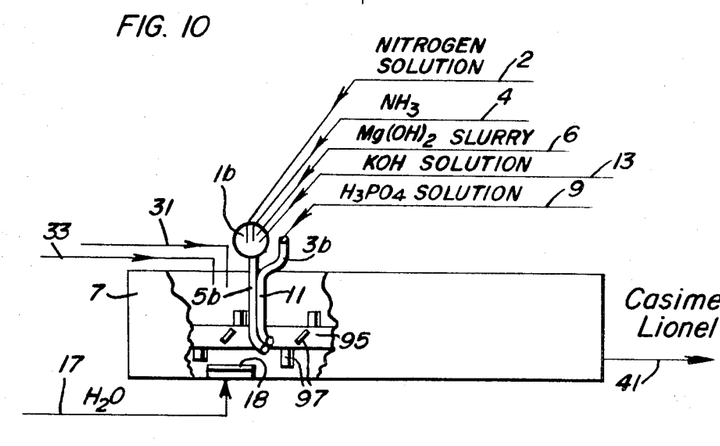

Refer to FIGS. 1, 2, 4, and 10. In this example the general procedure of Example II was repeated. The raw materials used in this example met the same specifications (analyses, etc.) as those used in Examples I and II. The nitrogen solution, $Mg(OH)_2$ slurry, and potassium hydroxide solution were mixed in in-line mixer 1b (FIG. 10), a four inch Gifford Wood In-Line Homogenizer, and passed into pug mill 7 via sparger 5b (FIG. 10). Orthophosphoric acid solution was fed into pug mill 7 via sparger 11 which was positioned immediately downstream of sparger 5b (FIG. 10). Feed rates were substantially the same as those used in Example II, supra. However, said procedure was modified by replacing sparger 19a (FIG. 10) which was placed immediately upstream of sparger 5b (FIG. 10). Thus, line 17 (delivering water including water from scrubber 27) discharged into pug mill 7 via block sparger 18 (FIG. 10) rather than via sparger 19a of Example II (FIG. 4). Feed rates, as noted supra, were substantially identical to those used in Example II.

The granular fertilizer made by the process of Example III crumbled on storage for three to four months, or upon shipment involving an appreciable amount of handling and dropping. Upon losing its noncrumbling characteristics, i.e., upon crumbling and ceasing to be completely granular in nature, the fertilizer also lost its nonburning characteristics.

Figure 7:
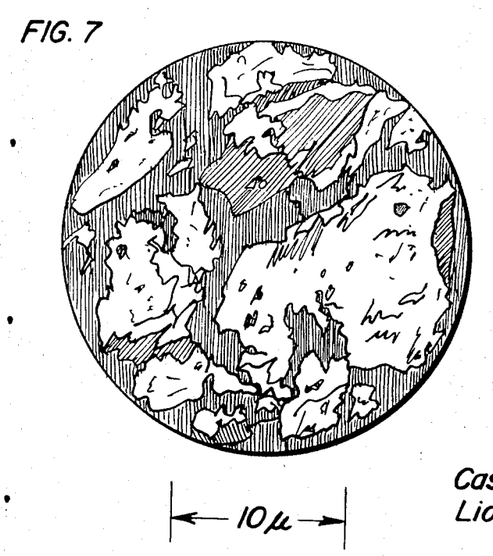
FIG. 7 is a drawing of an electron micrograph of the crystals comprising the aggregates (granules) of a fertilizer composition made by the process of Example III.

The crushing strength of granules of fertilizer made according to Example III was about the same as that of fertilizer made according to the process of Example II. Electron micrographs of the crystals comprising the aggregates (granules) of fertilizer made by the procedure of the instant example showed that these crystals had an average particle size of about 10 x 6 microns with individual particle sizes varying from about 0.5 x 0.8 micron to about 13 x 11 microns. FIG. 7 is a drawing of an electron micrograph of crystals comprising granules of fertilizer prepared according to the procedure of this example (Example III).

Product prepared according to the procedure of this example analyzed 3.3% moisture (free water), 7% total nitrogen 45.4% $P_2O_5$, 8.1% total $K_2O$, 6.2% available $K_2O$, and 12.5% Mg.

As used herein the term "phosphoric acid," unless otherwise defined where used, means orthophosphoric acid and the term "phosphate" (for example, in such names as magnesium ammonium phosphate and magnesium potassium phosphate) means orthophosphate unless otherwise defined where used.

As used herein the term "percent (%)" means percent by weight, unless otherwise defined where used, the term "parts" means parts by weight, unless otherwise defined where used, and the terms "mesh" and "screen size" refer to U.S. Standard mesh or screen size, unless otherwise defined where used. The term "recycle ratio" means ratio of parts of product recycled:parts of product recovered.

As will be readily apparent to those skilled in the art, the moving parts (e.g., agitators, pug mill shafts, rotary drums, pumps, fans, etc.) will move, operate, or function where conducting the process of this invention.

In the process of this invention, liquids, slurries, and gases, including dust-laden gases, can be conveyed in lines, mains, conduits, ducts, pipes, and the like. Liquids and slurries can also be conveyed, during gravity-driven flow of for short distances after exit from a pump, in open (or uncovered) chutes, troughs, and the like.

In the process of this invention, solids, including granules, pulverulent material, and crystalline material, can be conveyed in chutes, vibrating chutes, screw conveyors, pneumatic conveyors, elevators, including pneumatic and bucket, or cup type elevators, belt conveyors, bucket, or cup, type conveyors, and the like.

Bypass and flow dividing means suitable for use with solids in the process of this invention include: (a) overflow bins having means for varying or controlling the amount of overflow discharged therefrom; (b) overflow bins having means for varying or controlling the amount of underflow discharged therefrom; (c) Y's having their arms positioned downstream with dampers for varying or controlling flow positioned therein; and (d) two leg chutes with movable flow spreaders between the legs. Other bypass and flow dividing means suitable for use with solids in the process of this invention will be readily apparent to those skilled in the art.

Bypass and flow dividing means suitable for use with liquids and slurries in the process of this invention includes; (a) Y's having their arms positioned downstream with valves for varying or controlling flow positioned therein or communicating therewith; (b) T's having valves for varying or controlling flow positioned in or communicating with the downstream arms thereof; and (c) weir boxes positioned to receive discharge from pipes, lines, conduits, chutes, and the like, said boxes having two discharge ports or positions with means for controlling or varying the rate of discharge from said ports or positions. Other bypass and flow dividing means suitable for use with liquids and slurries will be readily apparent to those skilled in the art.

Crushers which can be used in the process of this invention include ball mills, chain mills, rod mills, rollers, and the like; still other types of crushers which can be used in the process of this invention will be readily apparent to those skilled in the art.

Where desired, pumps (e.g., centrifugal pumps, slurry pumps, air motivated pumps, and the like) can be used to pump liquids or slurries in the process of this invention. Where practical (i.e., where passing a liquid or slurry from a higher level to a lower level) gravity induced flow can be used in the process of this invention.

In the process of this invention, either direct or indirect heating can be used to heat air for drying product in the rotary drier; however, it is generally preferred to use direct heating.

Although twin shaft pug mills are generally preferred in the process of this invention, excellent results have been obtained with single shaft pug mills and with rotary drum granulators which, for the purpose of this invention, are equivalent to pug mills.

Flow of liquids and solutions can be measured with Rotometers, orifice type flowmeters, Venturi type flowmeters, or the like. The flow of magnesium hydroxide slurry can be measured with magnetic flowmeters, mass flowmeters, or the like. Magnetic flowmeters, mass flowmeters, and the like can also be used to measure the flow of liquids and solutions.

By "available $K_2O$" is meant the $K_2O$ values dissolved by ammonium oxalate solution according to procedure 2.060(a) of page 16 of "Official Methods of the Association of Official Agricultural Chemists," Ninth (1960) edition.

The spargers used to feed liquids and slurry into the pug mill in the process of our invention feed such liquids and slurry into the bottom portion of the pug mill. Such spargers preferably extend to within a few inches of the actual bottoms of the pug mills.

We claim:
1. A free-flowing, granular, nonburning, noncrumbling 7–40–6 fertilizer composition consisting essentially of 55.5–69% coprecipitated and cogranulated magnesium ammonium phosphate, 6–8% magnesium potassium phosphate, 5–8% monoammonium dihydrogen phosphate, 13–20% monopotassium dihydrogen phosphate, 4–6% magnesium hydroxide, 0.9–1.8% urea, 0.8–1.2% inert material and 2–4% free water and analyzing about: (i) 6.5–7.1% total nitrogen, as N; (ii) 42–46% total phosphoric acid, as $P_2O_5$; (iii) 7.2–8% total potash, as $K_2O$; and (iv) 1.4–2.5% water soluble nitrogen, as N, said granules of said fertilizer composition being aggregates of particles having an average particle size of about 1.5 x 0.75 microns, with said granules having a crushing resistance substantially according to the following schedule:

| Granules diameter, millimeters: | Crushing resistance, pounds |
|---|---|
| 2.8 | 4.8 |
| 4.4 | 7.0 |
| 6.0 | 11.6 |
| 7.1 | 14.4 |
| 10.5 | 26.3 | with intermediate values being substantially proportional.

2. The composition of claim 1 wherein the granules pass about a 6 mesh screen and are retained on about a 14 mesh screen.

3. The composition of claim 1 wherein the granules pass about a ½ inch screen and are retained on about a 6 mesh screen.

4. A process for preparing a free-flowing, granular nonburning, noncrumbling 7–40–6 fertilizer product, the granules of said fertilizer product being aggregates of particles having an average particle size of about 1.5 x 0.75 microns, said granules having a crushing resistance substantially according to the following schedule:

| Granule diameter, millimeters: | Crushing resistance, pounds |
|---|---|
| 2.8 | 4.8 |
| 4.4 | 7.0 |
| 6.0 | 11.6 |
| 7.1 | 14.4 |
| 10.5 | 26.3 | with intermediate values substantially proportional by a process comprising continuously and simultaneously:
(a) forming a first mixture by mixing in a mixer; (1) an aqueous solution of urea and ammonia, said solution analyzing about 35–45% urea and the ammonia therein taken with that referred to in "(2)," below, totaling about 170–180 pounds of ammonia, as $NH_3$, per ton of 7–40–6 fertilizer product formed; (2) liquid anhydrous ammonia; and (3) an aqueous magnesium hydroxide slurry having a solid content of about 30–60%, said slurry assaying about 20–41% MgO, with feed rates to the mixer providing; (i) about 40–46 pounds of urea, as added as said aqueous solution, per ton of fertilizer product formed; (ii) a total ammonia feed, that is the liquid anhydrous ammonia plus the ammonia referred to in "(1)" above, of about 170–180 pounds of ammonia, as $NH_3$, per ton of said 7–40–6 fertilizer product formed; and (iii) about 405–415 pounds of MgO, fed as said magnesium hydroxide slurry, per ton of said 7–40–6 fertilizer product formed;
(b) passing the thus formed first mixture into a first sparger and from said sparger into the bottom portion of a pug mill having an upstream end and a downstream end;
(c) passing an aqueous orthophosphoric acid solution and analyzing about 50–55% $P_2O_5$ into the pug mill via a second sparger positioned immediately downstream of the first sparger at a rate to provide about 860–900 pounds of $P_2O_5$ per ton of said fertilizer product;

(d) passing an aqueous potassium hydroxide solution analyzing about 35–40% $K_2O$ into the pug mill via a third sparger positioned immediately downstream of the second sparger at the rate of about 144–160 pounds of $K_2O$ fed as said KOH solution per ton of said fertilizer product;

(e) passing water into the pug mill via a fourth sparger positioned immediately upstream of the first sparger;

(f) recycling to the pug mill product selected from the group consisting of (i) an undersize fraction from a later recited screening step; (ii) a product size fraction from said screening step; and (iii) a mixture of said undersize fraction and said product size fraction;

(g) forming granular fertilizer product in the pug mill;

(h) withdrawing the granular fertilizer from the downstream end of the pug mill;

(i) passing the granular fertilizer through a drier where said fertilizer is dried by contacting it with a stream of air having an inlet temperature of about 450–1000° F.;

(j) passing the thus dried granular fertilizer product through a cooler where said fertilizer is cooled below about 130° F. by contacting it with a stream of air having an inlet temperature below about 100° F.

(k) screening the thus cooled fertilizer to obtain (i) an undersize fraction, (ii) at least one product size fraction; and (iii) an oversize fraction; and (l) recovering the product size fraction.

5. The process of claim 4 in which the oversize fraction is crushed and recycled to the screening step.

6. The process of claim 4 in which the recycled product is fed into the pug upstream of the spargers.

7. The process of claim 4 in which the granules pass about a 6 mesh screen and are retained on about a 14 mesh screen.

8. The process of claim 4 in which the granules pass about a ½ inch screen and are retained on about a 6 mesh screen.

9. The process of claim 4 in which the outlet temperature of the drying air is about 225–275° F.

References Cited

UNITED STATES PATENTS

| 2,827,368 | 3/1958 | Mortenson et al. | 71—29 |
| 3,174,844 | 3/1965 | Bridges et al. | 71—51X |
| 3,285,731 | 11/1966 | Salutsky et al. | 71—36X |

FOREIGN PATENTS

| 555,805 | 4/1958 | Canada | 71—29 |

REUBEN FRIEDMAN, Primary Examiner

R. BARNES, Assistant Examiner

U.S. Cl. X.R.

71—36, 51